United States Patent
Inoue

(10) Patent No.: US 12,490,112 B2
(45) Date of Patent: Dec. 2, 2025

(54) SERVER DEVICE, SENSOR DEVICE, VISUALIZATION SYSTEM, DATA DISPLAY METHOD, AND NON-TRANSITORY COMPUTER-READABLE MEDIUM

(71) Applicant: NEC Corporation, Tokyo (JP)

(72) Inventor: Takamichi Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 442 days.

(21) Appl. No.: 17/927,980

(22) PCT Filed: May 26, 2021

(86) PCT No.: PCT/JP2021/019962
§ 371 (c)(1),
(2) Date: Nov. 28, 2022

(87) PCT Pub. No.: WO2021/241627
PCT Pub. Date: Dec. 2, 2021

(65) Prior Publication Data
US 2023/0217262 A1   Jul. 6, 2023

(30) Foreign Application Priority Data
May 29, 2020   (JP) .................................. 2020-093936

(51) Int. Cl.
*H04W 16/18*   (2009.01)
*H04W 48/20*   (2009.01)
*H04W 72/54*   (2023.01)

(52) U.S. Cl.
CPC ........... *H04W 16/18* (2013.01); *H04W 48/20* (2013.01); *H04W 72/54* (2023.01)

(58) Field of Classification Search
CPC ..... H04W 16/18; H04W 48/20; H04W 72/54; H04W 64/006; H04W 84/22; H04W 84/12; H04W 4/38
See application file for complete search history.

(56) References Cited

U.S. PATENT DOCUMENTS

2018/0220417 A1* 8/2018 Matsuo ................. H04W 72/20
2018/0332434 A1* 11/2018 Kulkarni ................. H04L 43/08

FOREIGN PATENT DOCUMENTS

JP   2006-244120 A   9/2006
JP   2013-131159 A   7/2013
(Continued)

OTHER PUBLICATIONS

International Search Report for PCT Application No. PCT/JP2021/019962, mailed on Aug. 3, 2021.

*Primary Examiner* — Nizam U Ahmed
(74) *Attorney, Agent, or Firm* — Sughrue Mion, PLLC

(57) ABSTRACT

The server device according to the present disclosure includes: a communication unit (11) that receives, from a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area; a selection unit (12) that selects first area identification information from a plurality of pieces of area identification information, based on the wireless quality information, when a received plurality of pieces of the sensor information include a plurality of pieces of the area identification information; and a display unit (13) that displays information related to the wireless quality information in the area indicated by the first area identification information.

10 Claims, 8 Drawing Sheets

(56) References Cited

FOREIGN PATENT DOCUMENTS

| | | |
|---|---|---|
| JP | 2014-099772 A | 5/2014 |
| JP | 2019-106611 A | 6/2019 |

\* cited by examiner

SERVER DEVICE, SENSOR DEVICE, VISUALIZATION SYSTEM, DATA DISPLAY METHOD, AND NON-TRANSITORY COMPUTER-READABLE MEDIUM

This application is a National Stage Entry of PCT/JP2021/019962 filed on May 26, 2021, which claims priority from Japanese Patent Application 2020-093936 filed on May 29, 2020, the contents of all of which are incorporated herein by reference, in their entirety.

TECHNICAL FIELD

The present disclosure relates to a server device, a sensor device, a visualization system, and a data display method.

BACKGROUND ART

In recent years, maintaining or improving quality of a wireless communication system by a cloud server managing communication quality in the wireless communication system has been performed. The cloud server acquires information related to the communication quality from a wireless communication terminal in the wireless communication system. Further, by causing the cloud server to display the acquired information on a display unit such as a display, an administrator can easily acquire the communication quality of the wireless communication system.

Patent Literature 1 discloses a configuration of a system in which information being detected by a wireless sensor node, for example, temperature, is caused to be stored in a directory server. In Patent Literature 1, information of a base station to which a wireless sensor node is connected is used as position information of the wireless sensor node, and a position of the wireless sensor node and information being detected by the wireless sensor node are stored in association with each other in the directory server.

CITATION LIST

Patent Literature

[Patent Literature 1] Japanese Unexamined Patent Application Publication No. 2006-244120

SUMMARY OF INVENTION

Technical Problem

In the system disclosed in Patent Literature 1, when a wireless sensor node is located at a boundary of a communication area formed by a base station, there is a possibility that the wireless sensor node acquires or measures information indicating an environment within a communication area adjacent to a communication area to be monitored. Even in such a case, information of the base station to which the wireless sensor node is currently connected is used as position information of the wireless sensor node. Therefore, in the system disclosed in Patent Literature 1, there is a problem that information acquired by the wireless sensor node may differ from information related to an area indicated by associated position information in the directory server.

An object of the present disclosure is to provide a server device, a sensor device, a visualization system, and a data display method that are able to process information related to a plurality of areas without mixing the information.

Solution to Problem

A server device according to a first aspect of the present disclosure includes: a communication unit configured to receive, from a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area; a selection unit configured to select first area identification information from a plurality of pieces of area identification information, based on the wireless quality information, when a received plurality of pieces of the sensor information include a plurality of pieces of the area identification information; and a display unit configured to display information related to the wireless quality information in the area indicated by the first area identification information.

A sensor device according to a second aspect of the present disclosure includes: a collection unit configured to collect a packet being transmitted from a first wireless terminal within an area; a generation unit configured to generate wireless quality information in a predetermined period determined based on the packet; an area information assignment unit configured to assign area identification information for identifying the area to the wireless quality information; and a communication unit configured to transmit sensor information to which the area identification information is assigned to the wireless quality information to a server device via a network.

A visualization system according to a third aspect of the present disclosure includes: a sensor device configured to transmit sensor information in which area identification information for identifying an area is assigned to wireless quality information in a predetermined period determined based on a packet transmitted from a first wireless terminal within the area; and a server device configured to receive the sensor information from each of a plurality of the sensor devices that have collected a packet being transmitted from the first wireless terminal, select first area identification information from a plurality of pieces of area identification information, based on the wireless quality information, when a received plurality of pieces of the sensor information include a plurality of pieces of the area identification information, and display information related to the wireless quality information in the area indicated by the first area identification information.

A data display method according to a fourth aspect of the present disclosure includes: receiving, from each of a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area; selecting first area identification information from a plurality of pieces of area identification information, based on the wireless quality information, when a received plurality of pieces of the sensor information include a plurality of pieces of the area identification information; and displaying information related to the wireless quality information in the area indicated by the first area identification information.

A data transmission method according to a fifth aspect of the present disclosure includes: collecting a packet being transmitted from a first wireless terminal within an area; generating wireless quality information in a predetermined period determined based on the packet; assigning area identification information for identifying the area to the wireless quality information; and transmitting sensor information in which the area identification information is assigned to the wireless quality information to a server device via a network.

A program according to a sixth aspect of the present disclosure causes a computer to execute: receiving, from each of a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area; selecting first area identification information from a plurality of pieces of area identification information, based on the wireless quality information, when a received plurality of pieces of the sensor information include a plurality of pieces of the area identification information; and displaying information related to the wireless quality information in the area indicated by the first area identification information.

Advantageous Effects of Invention

According to the present disclosure, it is possible to provide a server device, a sensor device, a visualization system, and a data display method that are able to process information related to a plurality of areas without mixing the information.

EXAMPLE EMBODIMENT

Example Embodiment 1

Figure 1:
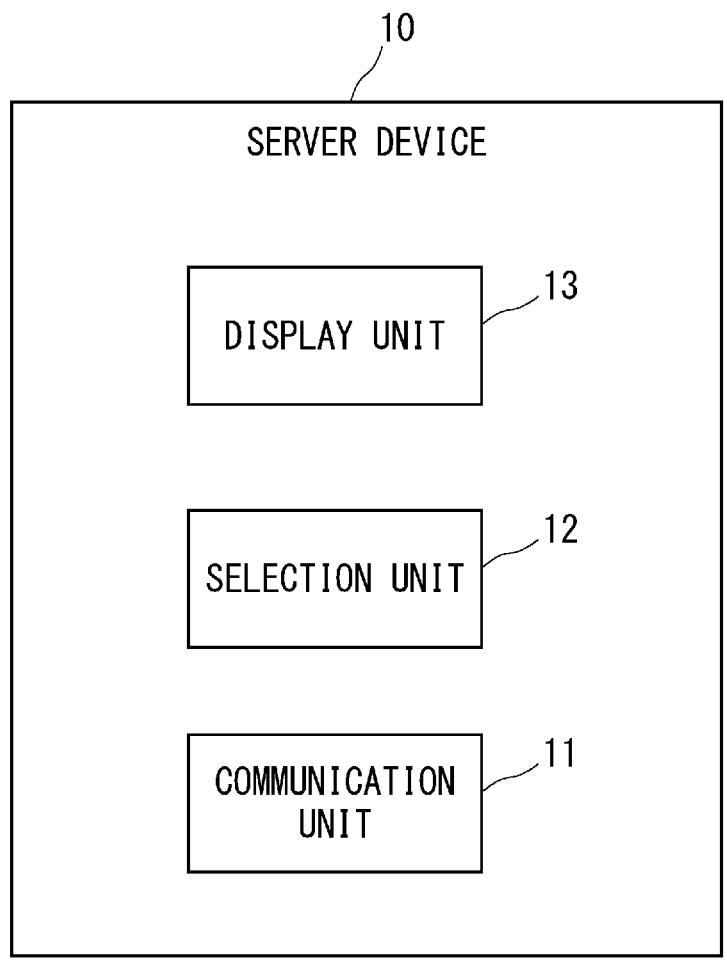
FIG. 1 is a configuration diagram of a server device according to a first example embodiment.

An example embodiment of the present disclosure will be described below with reference to the drawings. A configuration example of a server device 10 according to a first example embodiment will be described by using FIG. 1. The server device 10 may be a computer device that operates by a processor executing a program stored in a memory.

The server device 10 includes a communication unit 11, a selection unit 12, and a display unit 13. The communication unit 11, the selection unit 12, and the display unit 13 may be software or a module in which processing is executed by a processor executing a program stored in a memory. Alternatively, the communication unit 11, the selection unit 12, and the display unit 13 may be hardware such as a circuit or a chip.

The communication unit 11 receives sensor information to which area identification information for identifying an area is assigned to wireless quality information. The wireless quality information is information indicating wireless quality, in a predetermined period, of an area in which a sensor device is installed from a plurality of the sensor devices that have collected a packet transmitted from a first wireless terminal. The wireless quality information is determined based on a packet collected by the sensor device. In other words, the communication unit 11 receives sensor information including wireless quality information determined based on a packet related to the first wireless terminal from a plurality of the sensor devices.

Collecting a packet by the sensor device may be referred to as capturing a packet.

A packet may be referred to as a transmission frame, data, or the like. A plurality of areas may be provided within one floor of a building, or may be provided for each floor of the building. In addition, the area may be formed for each wireless area formed by a wireless device, or may be formed in such a way as to include a plurality of wireless areas. The wireless area may be, for example, a communication area including a wireless section in which a packet is transmitted between a base station and a wireless terminal. The base station may be, for example, a device supporting a communication standard such as a long term evolution (LTE), or may be a device supporting another communication standard defined in a 3rd generation partnership project (3GPP). Alternatively, the wireless area may be a communication area including a wireless section in which a packet is transmitted between an access point (AP) used for a wireless local area network (LAN) and a wireless terminal. In addition, the wireless area may be an area in which a low power wide area (LPWA), a Bluetooth (registered trademark), a ZigBee (registered trademark), a 5G, a local 5G, and the like are used.

The packet transmitted in the wireless area may be, for example, a packet transmitted between a wireless terminal, and a base station or an AP. The packet may be user data such as image data or moving image data, or may be control data. The user data may be referred to as, for example, a data frame, and the control data may be referred to as a management frame or a control frame.

The wireless quality information may be data indicating signal strength, the number of transmission packets, the number of retransmission packets, throughput, a transmission rate, a MCS, a busy time, or the like. The data indicating the signal strength may be referred to as a received signal strength indicator (RSSI). Each of pieces of the data indicating the wireless quality may be generated for each wireless terminal communicating with a base station, an AP, or the like, or may be a total value or an average value of a plurality of wireless terminals.

When a plurality of pieces of area identification information are included in a received plurality of pieces of sensor information, the selection unit 12 selects first area identification information from the plurality of pieces of area identification information, based on the wireless quality information. The area identification information may be a name of a floor of a building, a name indicating a specific position within the floor, or the like. Alternatively, the area identification information may be information indicating a wireless area. The information indicating the wireless area may be, for example, information for identifying the base station, or may be information for identifying the AP. As the information for identifying the AP, a service set identifier (SSID) or a basic service set identifier (BSSID) may be used.

An event including a plurality of pieces of area identification information may occur when a plurality of sensor devices installed at different locations from each other collect a packet transmitted from the first wireless terminal. For example, when the area is divided by the floor, a wireless sensor device may capture a packet transmitted from the first wireless terminal used on a floor different from the installed floor. Alternatively, although the first wireless terminal transmits a packet to a specific AP, base station, or the like, the first wireless terminal can also capture a packet transmitted by the first wireless terminal in a sensor device installed in a wireless area formed by another AP, base station, or the like.

For example, the selection unit 12 may select the area identification information associated with the wireless quality information indicating a state where the wireless quality is good. For example, it is estimated that the sensor device installed in an area where the first wireless terminal exists is located closest to the first wireless terminal. In such a case, it is estimated that signal strength of a packet received by the sensor device closest to the first wireless terminal from the first wireless terminal is larger than the signal strength of a packet received by another sensor device. Therefore, it can be estimated that the area identification information associated with the wireless quality information indicating the highest signal strength indicates the area in which the first wireless terminal exists. Alternatively, it may be estimated that the area identification information associated with the wireless quality information indicating the signal strength higher than a predetermined criterion indicates the area in which the first wireless terminal exists. Alternatively, an average value of the signal strength of the packets transmitted from the first wireless terminal may be calculated for each area, and the area having the highest average value may be estimated as the area in which the first wireless terminal exists.

The display unit 13 displays information related to wireless quality information in an area indicated by the first area identification information. The information related to the wireless quality information may be information specified or estimated from the wireless quality information. The information related to the wireless quality information may be, for example, position information of the first wireless terminal estimated based on the signal strength. The display unit 13 may display the wireless quality information.

As described above, even when there are a plurality of pieces of area identification information associated with the wireless quality information generated based on a packet related to the first wireless terminal, the server device 10 selects the area identification information, based on the wireless quality information. Thus, the area in which the first wireless terminal exists can be estimated. As a result, the display unit 13 can display information related to the wireless quality information generated based on the packet related to the first wireless terminal as information in an appropriate area.

Example Embodiment 2

Subsequently, a configuration example of a visualization system according to a second example embodiment will be described by using FIG. 2. The visualization system is a system in which a cloud server 700 visualizes a quality situation of an area or the like by using information acquired from a plurality of wireless sensors.

Figure 2:
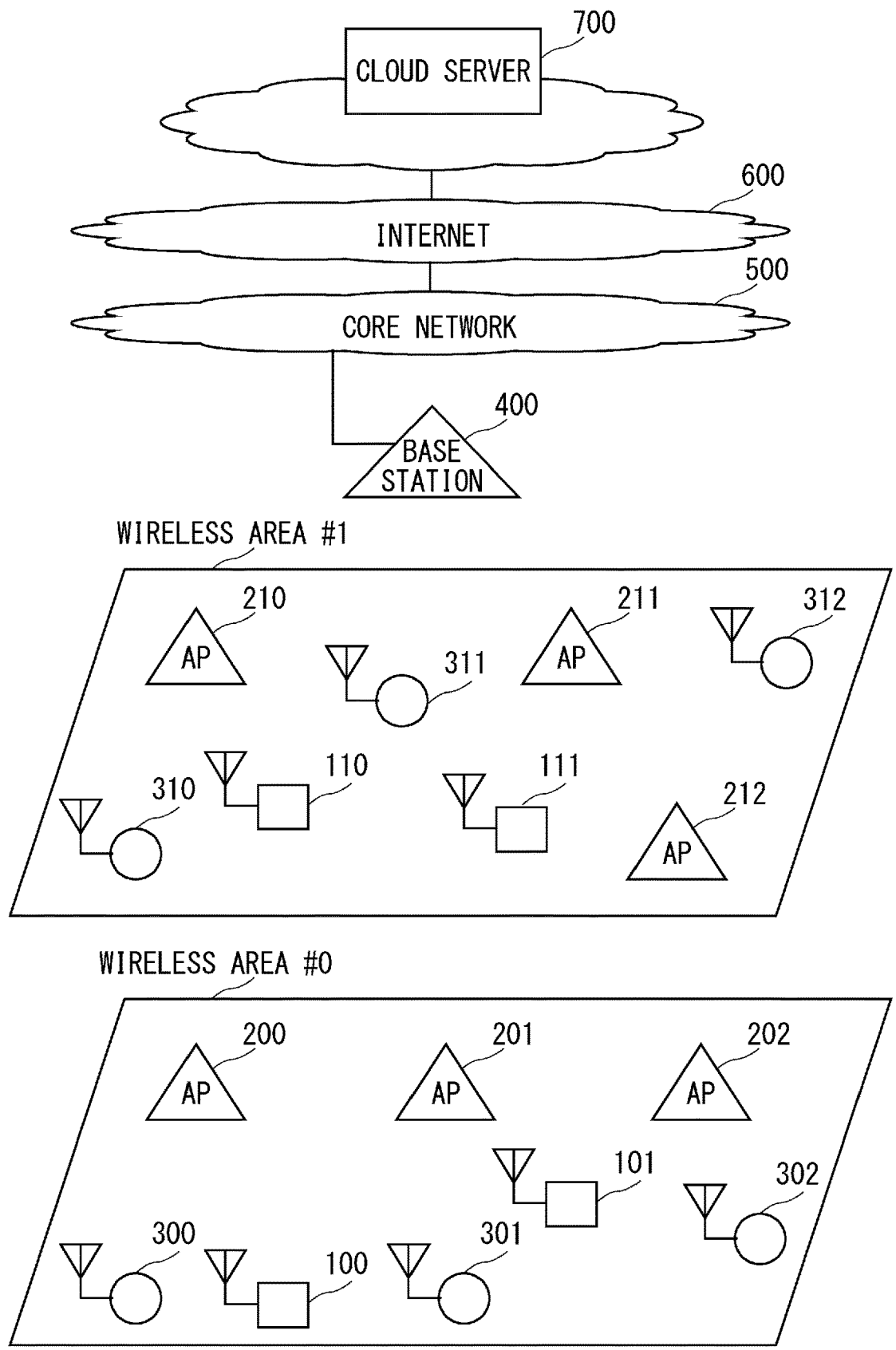
FIG. 2 is a configuration diagram of a visualization system according to a second example embodiment.

The visualization system in FIG. 2 includes access points (APs) 200 to 202, APs 210 to 212, wireless sensors 100 to 101, wireless sensors 110 to 111, wireless LAN terminals 300 to 302, and wireless LAN terminals 310 to 312. Further, the visualization system in FIG. 2 includes a base station 400, a core network 500, the Internet 600, and a cloud server 700. The cloud server 700 is equivalent to the server device 10 in FIG. 1. The wireless sensors 100 to 101 and the wireless sensors 110 to 111 are equivalent to a sensor device according to the first example embodiment.

The wireless LAN terminals 300 to 303 communicate with the APs 200 to 202 installed in an area #0. In addition, the wireless sensors 100 to 101 are installed in the area #0. In other words, the APs 200 to 202 are installed within the area #0, and the wireless LAN terminals 300 to 302, which are wireless LAN slave units, perform wireless LAN communication using any of the APs 200 to 202 as a wireless LAN master unit. In addition, the wireless sensor 100 and the wireless sensor 101 capture a packet transmitted and received within the area #0. In addition, the wireless sensor 100 and the wireless sensor 101 also capture a packet transmitted and received within an area #1 when a range in which the wireless LAN communication can be performed extends over the area #0 and the area #1.

The wireless LAN terminals 310 to 312 communicate with the APs 201 to 212 installed in the area #1. In addition, the wireless sensors 110 to 111 are installed in the area #1. In addition, the wireless sensor 110 and the wireless sensor 111 capture a packet transmitted and received within the area #1. In addition, the wireless sensor 110 and the wireless sensor 111 also capture a packet transmitted and received within the area #0 when a range in which the wireless LAN communication can be performed extends over the area #0 and the area #1.

The wireless LAN terminals 300 to 302 and the wireless LAN terminals 310 to 312 move between the area #0 and the area #1. For example, when the wireless LAN terminals 300 to 302 are connected to any of the APs 200 to 202, the wireless LAN terminals 300 to 302 may move to the area #1 and connect to any of the APs 210 to 21. In this case, the wireless LAN terminals 300 to 302 disconnect from the APs 200 to 202.

Herein, the wireless sensor 110 and the wireless sensor 111 are wireless sensors installed in the area #1, but there is a case where a packet transmitted and received by the wireless LAN terminals 300 to 302 belonging to the area #0 is captured. For example, the wireless sensors 110 and 111 can capture a packet transmitted and received within the area #1 by using a frequency band, a frequency channel, and the like used in wireless LAN communication within the area #1. Further, the wireless sensors 110 and 111 can capture a packet transmitted and received within the area #0 by using a frequency band, a frequency channel, and the like used in wireless LAN communication within the area #0.

The wireless sensors 100 to 101 and the wireless sensors 110 to 111 perform two-way communication with the cloud server 700 via the base station 400, the core network 500, and the Internet 600. The base station 400 may support a LTE, a 5G, or a local 5G, for example, as a wireless communication standard. The base station 400 establishes an LTE line, a 5G line, or a local 5G line with the wireless sensors 100 to 101 and the wireless sensors 110 to 111, and performs data communication. In addition, the wireless sensors 100 to 101 and the wireless sensors 110 to 111 may communicate with the Internet 600 via a wired line or an Ethernet (registered trademark). In addition, the cloud server 700 may be disposed in an intranet constructed within a specific company or the like.

In FIG. 2, a configuration in which there are two areas in the visualization system is illustrated, but the number of areas is not limited to two. In addition, the number of APs, wireless sensors, and wireless LAN terminals installed in each of areas is not limited to the number illustrated in FIG. 2. As described above, the area may be provided for each floor of a building, for example. In the example in FIG. 2, for example, the area #0 is a first floor, and the area #1 is a second floor.

Figure 3:
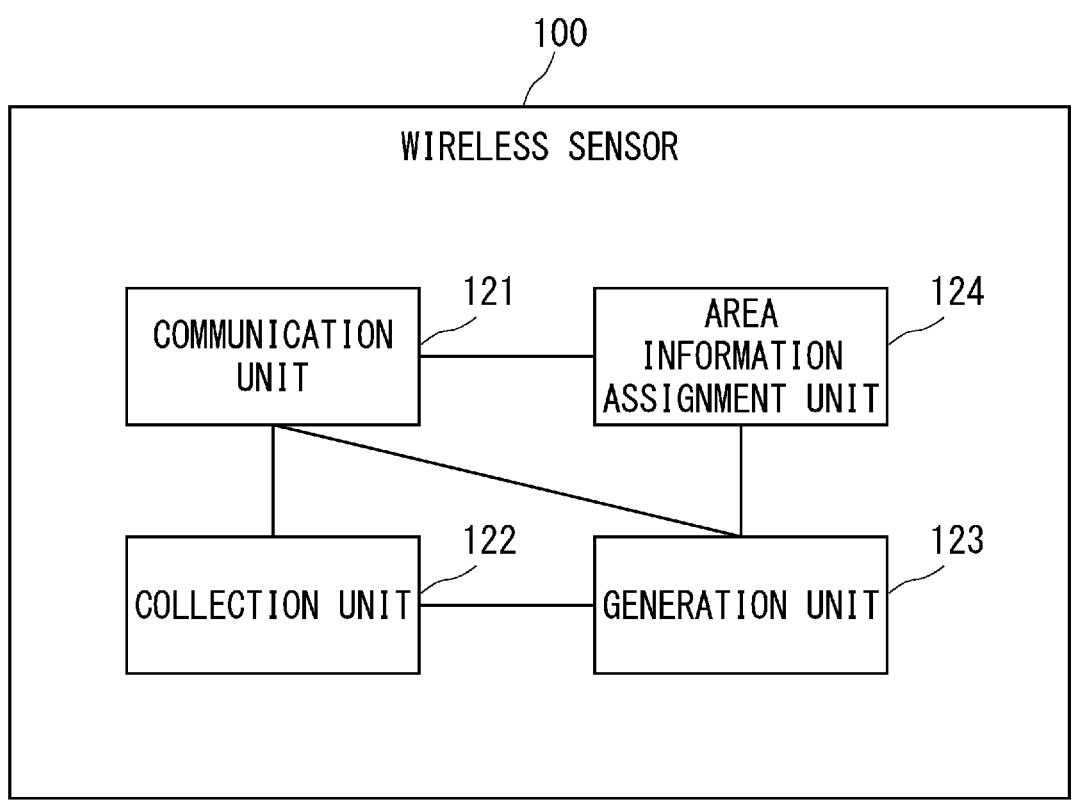
FIG. 3 is a configuration diagram of a wireless sensor according to the second example embodiment.

Subsequently, a configuration example of the wireless sensor 100 according to the second example embodiment will be described by using FIG. 3. Since the wireless sensor 101, the wireless sensor 110, and the wireless sensor 111 have a similar configuration with the wireless sensor 100, detailed description thereof is omitted.

The wireless sensor 100 includes a communication unit 121, a collection unit 122, a generation unit 123, and an area information assignment unit 124. The communication unit 121, the collection unit 122, the generation unit 123, and the area information assignment unit 124 may be software or a module in which processing is executed by a processor executing a program stored in a memory. Alternatively, the communication unit 121, the collection unit 122, the generation unit 123, and the area information assignment unit 124 may be hardware such as a circuit or a chip.

The communication unit 121 performs communication with the base station 400. The communication unit 121 performs communication with the base station 400 by using, for example, a wireless communication standard defined in 3GPP. Specifically, the communication unit 121 may communicate with the base station 400 by using an LTE. The communication unit 121 may be configured by an antenna, a modulator, and a demodulator that are associated to a frequency of wireless communication with the base station 400.

The communication unit 121 acquires a collection condition, an extraction condition, and area identification information of a packet from the cloud server 700 via the base station 400, the core network 500, and the Internet 600. The collection condition of a packet may be referred to as a capture condition of the packet. The communication unit 121 outputs the collection condition to the collection unit 122, outputs the extraction condition to the generation unit 123, and outputs the area identification information to the area information assignment unit 124. The communication unit 121 may periodically receive the collection condition, the extraction condition, and the area identification information from the cloud server 700, or may irregularly receive the collection condition, the extraction condition, and the area identification information having been changed. In addition, when the wireless sensor 100 is activated, the communication unit 121 may acquire the collection condition, the extraction condition, and the area identification information from the cloud server 700. The collection condition, the extraction condition, and the area identification information are set in the cloud server 700.

The collection unit 122 captures, according to the collection condition, a packet transmitted in a range in which the wireless sensor 100 can communicate. The range in which the wireless sensor 100 can communicate is different from an area in which the wireless sensor 100 is installed. In other words, when the communicable range extends over a plurality of areas, the wireless sensor 100 can also capture a packet transmitted in an area different from the installed area. The collection condition may be, for example, a frequency band, a frequency channel, a collection time, a collection period, a number of bytes, and the like. The collection condition may be one of a frequency band, a frequency channel, a collection time, a collection period, a number of bytes, and the like, and two or more thereof may be combined.

The collection unit 122 may be configured by an antenna, a modulator, and a demodulator that are associated to a frequency of wireless LAN communication with the APs 200 to 202 and the APs 210 to 212.

When two frequency channels are set, the collection unit 122 may capture packets of different frequency channels simultaneously by using two antennas, two modulators, and two demodulators. Alternatively, when two frequency channels are set, the collection unit 122 may capture packets of different frequency channels by switching the frequency channels at each predetermined time by using one antenna, one modulator, and one demodulator.

The generation unit 123 extracts, according to the extraction condition, a packet from among the packets captured by the collection unit 122. Extracting a packet may be referred to as selecting a packet. The extraction condition may be, for example, a transmission destination basic service set identifier (BSSID) or a transmission source BSSID of a packet. For example, a media access control (MAC) address of the AP 200 may be set in the BSSID. In addition, the extraction condition may be a transmission destination IP address or a transmission source IP address of a packet. In addition, the extraction condition may be a transmission destination MAC address or a transmission source MAC address of a packet. In other words, the generation unit 123 may extract a packet transmitted from a specific wireless LAN terminal, for example, the wireless LAN terminal 300, from among the captured packets. Alternatively, the generation unit 123 may extract all packets transmitted to the APs 200 to 202 in the area #0. The generation unit 123 may specify addresses of a plurality of wireless LAN terminals as the extraction condition. In addition, an IP address or a MAC address related to a packet to be captured may be specified as the extraction condition, or an IP address or a MAC address related to a packet not to be captured may be specified.

Further, the generation unit 123 generates wireless quality information to be observed or measured from the extracted packet. For example, the generation unit 123 may generate RSSI data to be observed from the extracted packet. The RSSI is not a RSSI of the packet received by the wireless LAN terminal or the AP, but a RSSI of the packet received by the wireless sensor 100.

Alternatively, the generation unit 123 may generate throughput data and transmission rate data of a packet transmitted by the wireless LAN terminal 300 by using the number of packets transmitted from the wireless LAN terminal 300 within a predetermined period, and a data length and the like of the packet. Alternatively, the generation unit 123 may determine whether a packet is a retransmission packet by analyzing a header portion of the packet, and generate data indicating the number of retransmission packets. Alternatively, the generation unit 123 may generate data related to a band occupancy rate of the wireless LAN terminal 300 by using a maximum line speed between the AP 200 and the wireless LAN terminal and the throughput data of the wireless LAN terminal 300. Alternatively, the generation unit 123 may generate data related to a retransmission rate of a packet by using the total number of received packets and the number of retransmission packets. The retransmission rate of a packet may be generated for each wireless LAN terminal, or may be generated as data of the entire wireless LAN system 210.

The area information assignment unit 124 assigns area identification information to wireless quality information generated by the generation unit 123. The area identification information is information for identifying the area #0 in which the wireless sensor 100 is installed. For example, the area identification information may be information indicating a floor such as a first floor or a second floor. Alternatively, the area identification information may be information for identifying a room such as a conference room within the floor. The communication unit 121 transmits sensor information to which the area identification information is assigned to the wireless quality information to the cloud server 700 via the base station 400, the core network 500, and the Internet 600.

Figure 4:
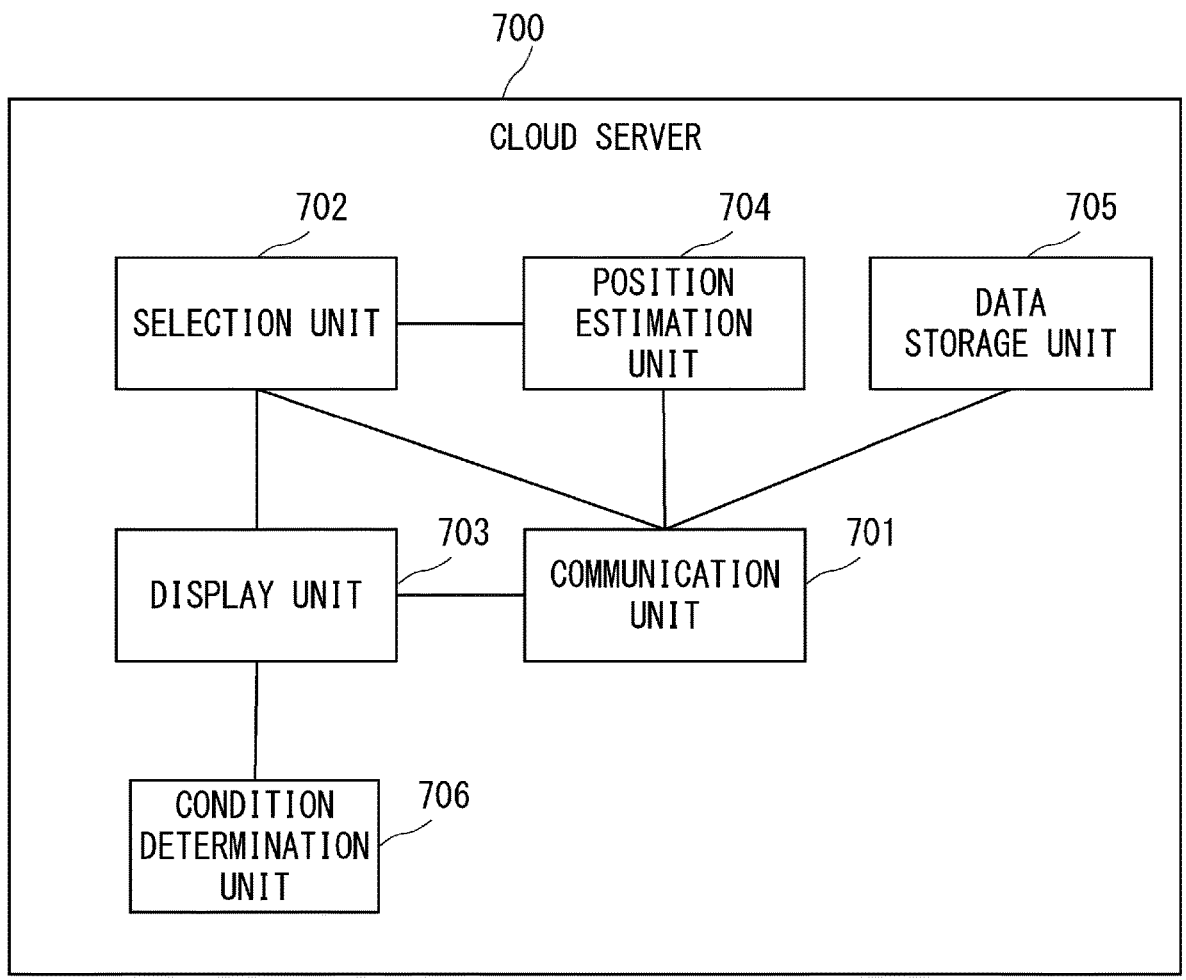
FIG. 4 is a configuration diagram of a cloud server according to the second example embodiment.

Subsequently, a configuration example of the cloud server 700 according to the second example embodiment will be described by using FIG. 4. The cloud server 700 may be a computer device that operates by a processor executing a program stored in a memory. In addition, the cloud server 700 may have a built-in memory for storing a database, or may be connected to a database server device via a network, a cable, or the like. The cloud server 700 stores data received from the wireless sensors 100 to 101 and the wireless sensors 110 to 111 in the database.

The cloud server 700 includes a communication unit 701, a selection unit 702, a display unit 703, a position estimation unit 704, a data storage unit 705, and a condition determination unit 706. The communication unit 701, the selection unit 702, the display unit 703, the position estimation unit 704, the data storage unit 705, and the condition determination unit 706 may be software or a module in which processing is executed by a processor executing a program stored in a memory. Alternatively, the communication unit 701, the selection unit 702, the display unit 703, the position estimation unit 704, the data storage unit 705, and the condition determination unit 706 may be hardware such as a circuit or a chip.

The condition determination unit 706 causes the display unit 703 to display information related to setting of the collection condition, the extraction condition, and the area identification information of a packet. An administrator of the cloud server 700 may confirm the information displayed on the display unit 703, and input the collection condition, extraction condition, and area identification information of a packet. The display unit 703 may display, for example, parameter information selectable as the collection condition, the extraction condition, and the area identification information of a packet. In addition, an administrator inputs information in which the area identification information and identification information of the wireless sensor are associated with each other, based on the information displayed on the display unit 703. For example, wireless sensors 100 and 101 are associated with area identification information indicating area #0, and wireless sensors 110 and 111 are associated with area identification information indicating area #1. The identification information of the wireless sensor may be information indicating a name for identifying the wireless sensor, or may be address information such as an IP address or a MAC address.

The condition determination unit 706 stores, in the data storage unit 705 via the communication unit 701, the collection condition, the extraction condition, and the area identification information of a packet that are determined according to the input information. In addition, the communication unit 701 transmits the collection condition, the extraction condition, and the area identification information that are output from the condition determination unit 706 to the wireless sensors 100 and 101 and the wireless sensors 110 and 111 via the Internet 600, the core network 500, and the base station 400. The condition determination unit 706 may determine different collection conditions, extraction conditions, or pieces of area identification information for each wireless sensor.

When the collection condition, the extraction condition, and the area identification information are changed, the condition determination unit 706 may transmit a change notification indicating that the collection condition, the extraction condition, and the area identification information are changed, to each of wireless sensors. In this case, the wireless sensor that has received the change notification accesses the cloud server 700, and acquires the changed collection condition, extraction condition, and area identification information. Alternatively, the condition determination unit 706 may transmit the changed information to the wireless sensor without transmitting the change notification. Alternatively, the condition determination unit 706 may periodically transmit the collection condition, the extraction condition, and the area identification information to each of wireless sensors. In addition, the condition determination unit 706 outputs the changed collection condition, extraction condition, or area identification information to the data storage unit 705 via the communication unit 701. The data storage unit 705 stores the received changed collection condition, extraction condition, or area identification information.

In addition, the communication unit 701 receives wireless quality information from the wireless sensors 100 and 101 and the wireless sensors 110 and 111. The communication unit 701 stores the received wireless quality information in the data storage unit 705. The display unit 703 processes the data stored in the data storage unit 705 into display data, and displays the display data.

Figure 5:
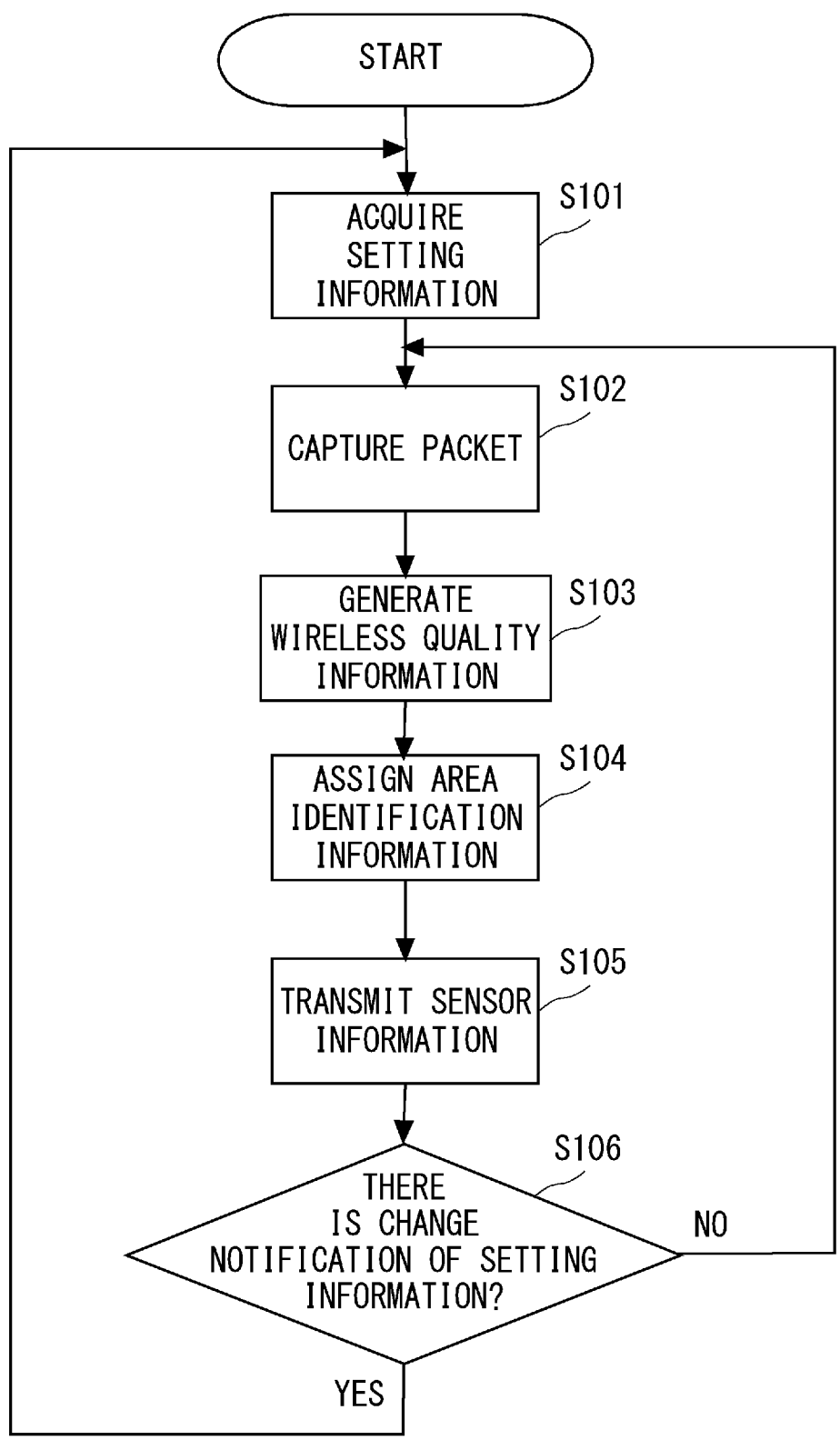
FIG. 5 is a diagram illustrating a flow of transmission processing of wireless quality information in the wireless sensor according to the second example embodiment.

Subsequently, a flow of transmission processing of wireless quality information in the wireless sensor 100 according to the second example embodiment will be described by using FIG. 5. First, the communication unit 121 receives setting information from the cloud server 700 (S101). The setting information includes at least one of a collection condition, an extraction condition, and area identification information. For example, the communication unit 121 may receive a newly set collection condition, extraction condition, and piece of area identification information, or may receive a changed collection condition, extraction condition, or piece of area identification information.

Next, the collection unit 122 captures a packet that can be captured according to the collection condition (S102). For example, the collection unit 122 may capture not only a packet transmitted and received in the area #0 but also a packet transmitted and received in the area #1. Next, the generation unit 123 generates, according to the extraction condition, wireless quality information to be observed from the extracted packet (S103). For example, the generation unit 123 may extract only a packet related to the wireless LAN terminal 300 from the captured packets. Alternatively, the generation unit 123 may extract a packet related to a wireless LAN terminal that communicates with the AP in the area #1.

Next, the area information assignment unit 124 generates sensor information in which area identification information is assigned to each of pieces of the generated wireless quality information (S104). For example, the area information assignment unit 124 assigns the area identification information indicating the area #0 to the wireless quality information.

Next, the communication unit 121 transmits, to the cloud server 700, the sensor information to which the area information is assigned to the wireless quality information in the area information assignment unit 124 (S105).

Next, the communication unit 121 decides whether a change notification of the setting information has been received from the cloud server 700 (S106). When the communication unit 121 receives the change notification of the setting information, the processing in and after step S101 is repeated. When the communication unit 121 has not received the change notification of the setting information, the processing in and after step S102 is repeated.

Figure 6:
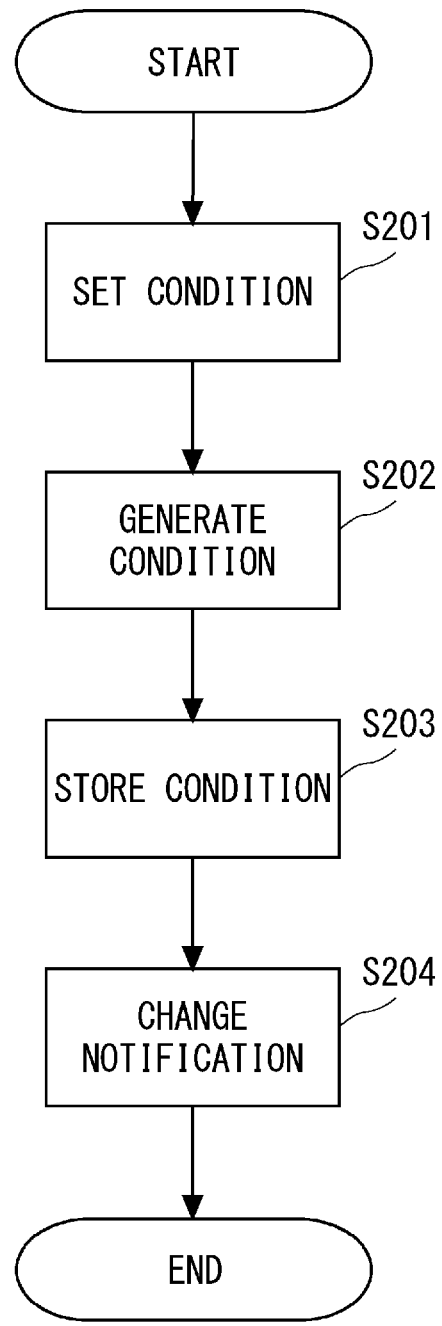
FIG. 6 is a diagram illustrating a flow of change processing of setting information in the cloud server according to the second example embodiment.

Subsequently, by using FIG. 6, a flow of change processing of setting information in the cloud server 700 according to the second example embodiment will be described. First, the condition determination unit 706 displays, on the display unit 703, information related to setting of the collection condition, the extraction condition, and the area identification information, and accepts setting of the collection condition, the extraction condition, and the area identification information from an administrator (S201). Next, the condition determination unit 706 generates the collection condition, the extraction condition, and the area identification information according to information input from an administrator (S202).

Next, the condition determination unit 706 stores the generated collection condition, extraction condition, and area identification information in the data storage unit 705 (S203). For example, the condition determination unit 706 outputs the collection condition, the extraction condition, and the area identification information to the data storage unit 705 via the communication unit 701. In addition, the communication unit 701 transmits the collection condition, the extraction condition, and the area identification information to the wireless sensors 100 to 101 and the wireless sensors 110 to 111 via the Internet 600, the core network 500, the base station 400, the APs 200 to 202, and the APs 210 to 212.

Next, when the collection condition, the extraction condition, or the area identification information is changed by being input new information from an administrator or the like, the condition determination unit 706 transmits a change notification to the wireless sensors 100 to 101 and the wireless sensors 110 to 111 (S204). Thereafter, the condition determination unit 706 transmits the changed collection condition, extraction condition, or area identification information to the wireless sensors 100 to 101 and the wireless sensors 110 to 111 via the communication unit 701, in response to a request from the wireless sensors 100 to 101 and the wireless sensors 110 to 111. Alternatively, the condition determination unit 706 may transmit the changed collection condition, extraction condition, or area identification information to the wireless sensors 100 to 101 and the wireless sensors 110 to 111 via the communication unit 701, without transmitting the change notification.

Figure 7:
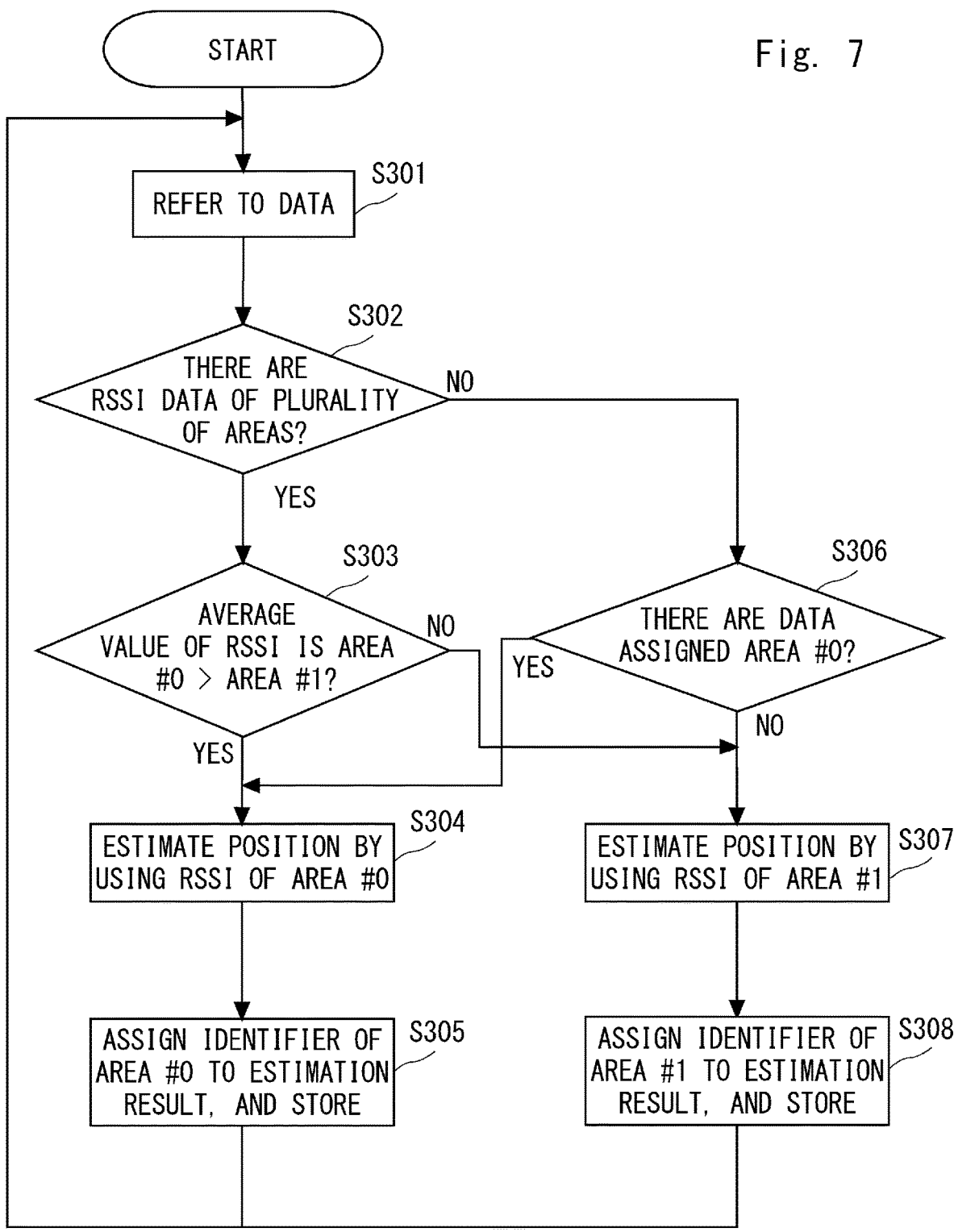
FIG. 7 is a diagram illustrating a flow of estimation processing of position information in the cloud server according to the second example embodiment.

Subsequently, a flow of estimation processing of position information in the cloud server 700 according to the second example embodiment will be described by using FIG. 7. First, the selection unit 702 refers to a plurality of pieces of RSSI data related to the wireless LAN terminal 300 whose position is to be estimated, from the data storage unit 705 via the communication unit 701 (S301). The selection unit 702 refers to RSSI data stored in the data storage unit 705. The RSSI data related to the wireless LAN terminal 300 are data indicating an RSSI value observed based on a packet transmitted from the wireless LAN terminal 300.

Next, the selection unit 702 decides whether the area identification information assigned to the plurality of pieces of referred RSSI data includes a plurality of pieces of area identification information (S302). For example, the selection unit 702 decides whether the RSSI data to which the area #0 is assigned and the RSSI data to which the area #1 is assigned are mixed.

When the selection unit 702 decided that a plurality of pieces of area identification information are included, the selection unit 702 decides whether an average value of the RSSI of the area #0 exceeds an average value of the RSSI of the area #1 (S303). The average value of the RSSI of the area #0 is an average value of values indicated by the RSSI data to which the area #0 is assigned.

When the selection unit 702 decides that the average value of the RSSI of the area #0 exceeds the average value of the RSSI of the area #1, the position estimation unit 704 estimates a position of the wireless LAN terminal 300 by using the RSSI data of the area #0 (S304). For example, as a position estimation method executed by the position estimation unit 704, a three-point positioning algorithm or the like for estimating a relative position with respect to each wireless sensor by using a path-loss model of RSSI intensity and a radio wave observed by each wireless sensor may be used. The position of the wireless LAN terminal 300 may be, for example, a position indicated by using an XY coordinate system.

Next, the position estimation unit 704 assigns the identification information of the area #0 to the position information of the wireless LAN terminal 300, and stores in the data storage unit 705 via the communication unit 701 (S305). After the position estimation unit 704 stores the position information to which the area identification information is assigned in the data storage unit 705, the processing in and after step S301 is repeated.

In step S302, when the selection unit 702 decides that a plurality of pieces of area identification information are not included, the selection unit 702 decides whether the area identification information assigned to the RSSI data is area #0 (S306). When the selection unit 702 indicates that the area identification information assigned to the RSSI data is the area #1, the position estimation unit 704 estimates the position of the wireless LAN terminal 300 by using the RSSI data of the area #1 (S307).

Next, the position estimation unit 704 assigns the identification information of the area #1 to the position information of the wireless LAN terminal 300, and stores in the data storage unit 705 via the communication unit 701. After the position estimation unit 704 stores the position information to which the area identification information is assigned in the data storage unit 705, the processing in and after step S301 is repeated.

In step S303, when the selection unit 702 decides that the average value of the RSSI of the area #0 does not exceed the average value of the RSSI of the area #1, the processing in and after step S307 is performed. In addition, in step S306, when the selection unit 702 decides that the area identification information assigned to the RSSI data indicates the area #1, the processing in and after step S304 is performed.

As described above, in the visualization system according to the second example embodiment, the cloud server 700 can select an area and estimate the position of the wireless LAN terminal 300 when there are RSSI data related to the wireless LAN terminal 300 in which a plurality of areas are mixed. In other words, the cloud server 700 can select an area for estimating the position of the wireless LAN terminal 300.

For example, even when the wireless LAN terminal 300 moves between the area #0 and the area #1, the cloud server 700 can estimate in which area the wireless LAN terminal 300 is located. As a result, the cloud server 700 can appropriately display an area where the wireless LAN terminal 300 exists on the display unit 703, for example.

In FIG. 2, an example in which the area becomes a plurality of hierarchical areas has been described, but a plurality of areas may exist in the same hierarchical level, or the areas may exist at positions separated from each other.

In addition, in the second example embodiment, when RSSI data of a plurality of areas are mixed, processing of estimating a position by using RSSI of an area in which the average value of the RSSI is exceeded has been described. On the other hand, when RSSI data of a plurality of areas are mixed, the position of the wireless LAN terminal 300 may be estimated by using RSSI in each of areas, and the average value of RSSI for each area used when estimating the position may be compared. In this case, the position estimation unit 704 may estimate an area in which the average value of the RSSI is exceeded as an area in which the wireless LAN terminal 300 exists.

Figure 8:
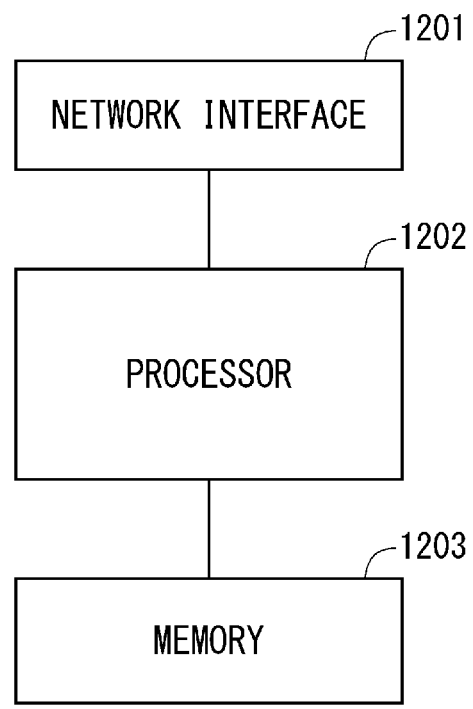
FIG. 8 is a configuration diagram of a sensor device, a wireless sensor, and a cloud server according to each of example embodiments.

FIG. 8 is a block diagram illustrating a configuration example of the server device 10, the wireless sensor 100, and the cloud server 700 (hereinafter, referred to as the server device 10 and the like). Referring to FIG. 8, the server device 10 and the like include a network interface 1201, a processor 1202, and a memory 1203. The network interface 1201 is used for communicating with a network node (e.g., an eNB, an MME, a P-GW,). The network interface 1201 may include, for example, a network interface card (NIC) compliant with IEEE 802.3 series. Herein, an eNB represents an evolved Node B, an MME represents a mobility management entity, and a P-GW represents a packet data network gateway. IEEE represents the Institute of Electrical and Electronics Engineers.

The processor 1202 reads software (a computer program) from the memory 1203 and executes the software (computer program), and thereby performs processing of the server device 10 and the like described by using the flowcharts in the example embodiment described above. The processor 1202 may be, for example, a microprocessor, an MPU, or a CPU. The processor 1202 may include a plurality of processors.

The memory 1203 is configured by a combination of a volatile memory and a nonvolatile memory. The memory 1203 may include a storage disposed away from the processor 1202. In this case, the processor 1202 may access the memory 1203 via an input/output (I/O) interface being not illustrated.

In the example in FIG. 8, the memory 1203 is used for storing a software module group. The processor 1202 reads the software module group from the memory 1203 and executes the read module group, and thereby can perform the processing of the server device 10 and the like described in the above example embodiments.

As described by using FIG. 8, each of the processors included in the server device 10 and the like in the above-described example embodiments executes one or a plurality of programs including an instruction group for causing a computer to execute an algorithm described by using the drawings.

In the above examples, a program can be stored by using various types of non-transitory computer readable media, and supplied to a computer. The non-transitory computer readable medium includes various types of tangible storage media. Examples of the non-transitory computer readable medium include a magnetic recording medium (e.g., a flexible disk, a magnetic tape, a hard disk drive), a magneto-optical recording medium (e.g., a magneto-optical disk), a CD-read only memory (ROM), a CD-R, a CD-R/W, and a semiconductor memory (e.g., a mask ROM, a programmable ROM (PROM), an erasable PROM (EPROM), a flash ROM, a random access memory (RAM)). In addition, the program may also be supplied to the computer by various types of transitory computer readable media. Examples of the transitory computer readable medium include an electric signal, an optical signal, and an electromagnetic wave. The transitory computer readable medium can supply the program to the computer via a wired communication path such as an electric wire and an optical fiber, or a wireless communication path.

Note that, the present disclosure is not limited to the above-mentioned example embodiments, and can be modified as appropriate within a range not deviating from the gist.

Although the invention of the present application has been described above with reference to the example embodiments, the invention of the present application is not limited to the above. Various modifications can be made to the structure and details of the invention of the present application which can be understood by a person skilled in the art within the scope of the invention.

Some or all of the above example embodiments may also be described as the following supplementary notes, but are not limited to the following.

(Supplementary Note 1)

A server device comprising:
  communication means for receiving, from a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area;
  selection means for selecting first area identification information from a plurality of pieces of area identification information, based on the wireless quality information, when a received plurality of pieces of the sensor information include a plurality of pieces of the area identification information; and
  display means for displaying information related to the wireless quality information in the area indicated by the first area identification information.

(Supplementary Note 2)

The server device according to Supplementary note 1, wherein the communication means transmits, to each of sensor devices, the area identification information for identifying an area in which the sensor device is installed.

(Supplementary Note 3)

The server device according to Supplementary note 1 or 2, wherein the area includes a communication area formed by a base station or an access point that performs wireless local area network (LAN) communication.

(Supplementary Note 4)

The server device according to Supplementary note 3, wherein the area is identified by an SSID being included in the access point.

(Supplementary Note 5)

The server device according to any one of Supplementary notes 1 to 4, wherein the selection means calculates an average value of the wireless quality for each of the areas, and selects, as the first area identification information, area identification information indicating the area in which the average value of the wireless quality is best.

(Supplementary Note 6)

The server device according to any one of Supplementary notes 1 to 5, further comprising position estimation means for estimating a position of the first wireless terminal in the area indicated by the first area identification information, by using received signal strength of the packet in the sensor device as the wireless quality information.

(Supplementary Note 7)

The server device according to any one of Supplementary notes 1 to 5, further comprising position estimation means for estimating a position of the first wireless terminal for each of the areas, by using received signal strength of the packet in the sensor device as the wireless quality information,
wherein the display means displays a position of the first wireless terminal in the area indicated by the first area identification information.

(Supplementary Note 8)

A sensor device comprising:
collection means for collecting a packet transmitted from a first wireless terminal within an area;
generation means for generating wireless quality information in a predetermined period determined based on the packet;
area information assignment means for assigning area identification information for identifying the area to the wireless quality information; and
communication means for transmitting sensor information in which the area identification information is assigned to the wireless quality information, to a server device via a network.

(Supplementary Note 9)

The sensor device according to Supplementary note 8, wherein the communication means receives, from the server device, the area identification information for identifying the area in which the sensor device is located.

(Supplementary Note 10)

A visualization system comprising:
a sensor device configured to transmit sensor information in which area identification information for identifying an area is assigned to wireless quality information in a predetermined period determined based on a packet transmitted from a first wireless terminal within the area; and
a server device configured to receive the sensor information from each of a plurality of the sensor devices that have collected a packet being transmitted from the first wireless terminal, select first area identification information from a plurality of pieces of area identification information, based on the wireless quality information, when a received plurality of pieces of the sensor information include a plurality of pieces of the area identification information, and display information related to the wireless quality information in the area indicated by the first area identification information.

(Supplementary Note 11)

The visualization system according to Supplementary note 10, wherein the server device transmits, to each of sensor devices, the area identification information for identifying an area in which the sensor device is installed.

(Supplementary Note 12)

A data display method comprising:
receiving, from each of a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area;
selecting first area identification information from a plurality of pieces of area identification information, based on the wireless quality information, when a received plurality of pieces of the sensor information include a plurality of pieces of the area identification information; and
displaying information related to the wireless quality information in the area indicated by the first area identification information.

(Supplementary Note 13)

A data transmission method comprising:
collecting a packet being transmitted from a first wireless terminal within an area;
generating wireless quality information in a predetermined period determined based on the packet;
assigning area identification information for identifying the area to the wireless quality information; and
transmitting sensor information in which the area identification information is assigned to the wireless quality information to a server device via a network.

(Supplementary Note 14)

A non-transitory computer-readable medium storing a program causing a computer to execute:
receiving, from each of a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area;
selecting first area identification information from a plurality of pieces of area identification information, based on the wireless quality information, when a received plurality of pieces of the sensor information include a plurality of pieces of the area identification information; and
displaying information related to the wireless quality information in the area indicated by the first area identification information.

(Supplementary Note 15)

A non-transitory computer-readable medium storing a program causing a computer to execute:
collecting a packet being transmitted from a first wireless terminal within an area;
generating wireless quality information in a predetermined period determined based on the packet;
assigning area identification information for identifying the area to the wireless quality information; and
transmitting sensor information in which the area identification information is assigned to the wireless quality information to a server device via a network.

Although the invention of the present application has been described above with reference to the example embodiments, the invention of the present application is not limited to the above. Various modifications can be made to the structure and details of the invention of the present application which can be understood by a person skilled in the art within the scope of the invention.

This application is based upon and claims the benefit of priority from Japanese patent application No. 2020-93936, filed on May 29, 2020, the disclosure of which is incorporated herein in its entirety by reference.

REFERENCE SIGNS LIST

10 SERVER DEVICE
11 COMMUNICATION UNIT
12 SELECTION UNIT
13 DISPLAY UNIT
100 WIRELESS SENSOR
101 WIRELESS SENSOR
110 WIRELESS SENSOR
111 WIRELESS SENSOR
121 COMMUNICATION UNIT
122 COLLECTION UNIT
123 GENERATION UNIT
124 AREA INFORMATION ASSIGNMENT UNIT
200 AP
201 AP
202 AP
210 AP
211 AP
212 AP
300 WIRELESS LAN TERMINAL
301 WIRELESS LAN TERMINAL
302 WIRELESS LAN TERMINAL
310 WIRELESS LAN TERMINAL
311 WIRELESS LAN TERMINAL
312 WIRELESS LAN TERMINAL
400 BASE STATION
500 CORE NETWORK
600 INTERNET
700 CLOUD SERVER
701 COMMUNICATION UNIT
702 SELECTION UNIT
703 DISPLAY UNIT
704 POSITION ESTIMATION UNIT
705 DATA STORAGE UNIT
706 CONDITION DETERMINATION UNIT

What is claimed is:

1. A server device comprising:
at least one memory storing instructions, and
at least one processor configured to execute the instructions to:
receive, from each of a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area;
select first area identification information from a plurality of pieces of area identification information, based on the wireless quality information, when a received plurality of pieces of the sensor information include a plurality of pieces of the area identification information; and
display information related to the wireless quality information in the area indicated by the first area identification information.

2. The server device according to claim 1, wherein the at least one processor is further configured to execute the instructions to transmit, to each of sensor devices, the area identification information for identifying the area in which the sensor device is installed.

3. The server device according to claim 1, wherein the area includes a communication area formed by a base station or an access point that performs wireless local area network (LAN) communication.

4. The server device according to claim 3, wherein the area is identified by an SSID being included in the access point.

5. The server device according to claim 1, wherein the at least one processor is further configured to execute the instructions to calculate an average value of the wireless quality for each of the areas, and select, as the first area identification information, area identification information indicating the area in which the average value of the wireless quality is best.

6. The server device according to claim 1, wherein the at least one processor is further configured to execute the instructions to estimate a position of the first wireless terminal in the area indicated by the first area identification information, by using received signal strength of the packet in the sensor device as the wireless quality information.

7. The server device according to claim 1, wherein the at least one processor is further configured to execute the instructions to estimate a position of the first wireless terminal for each of the areas, by using received signal strength of the packet in the sensor device as the wireless quality information, and
display a position of the first wireless terminal in the area indicated by the first area identification information.

8. A sensor device comprising:
at least one memory storing instructions, and
at least one processor configured to execute the instructions to:
collect a packet transmitted from a first wireless terminal within an area;
generate wireless quality information in a predetermined period determined based on the packet;
assign area identification information for identifying the area to the wireless quality information; and
transmit sensor information in which the area identification information is assigned to the wireless quality information, to a server device via a network.

9. The sensor device according to claim 8, wherein the at least one processor is further configured to execute the instructions to receive, from the server device, the area identification information for identifying the area in which the sensor device is located.

10. A data display method comprising:
receiving, from each of a plurality of sensor devices that have collected a packet being transmitted from a first wireless terminal, sensor information in which area identification information for identifying an area in which the sensor device is installed is assigned to wireless quality information determined based on the packet, the wireless quality information indicating wireless quality, in a predetermined period, of the area;
selecting first area identification information from a plurality of pieces of area identification information, based on the wireless quality information, when a received plurality of pieces of the sensor information include a plurality of pieces of the area identification information; and displaying information related to the wireless quality information in the area indicated by the first area identification information.

* * * * *